Feb. 22, 1966 L. E. AUSTIN 3,236,323
VEHICLE STABILIZING SYSTEM
Filed Nov. 20, 1962 7 Sheets-Sheet 1

INVENTOR.
LEONARD E. AUSTIN.
BY
William P. Hickey
ATTORNEY.

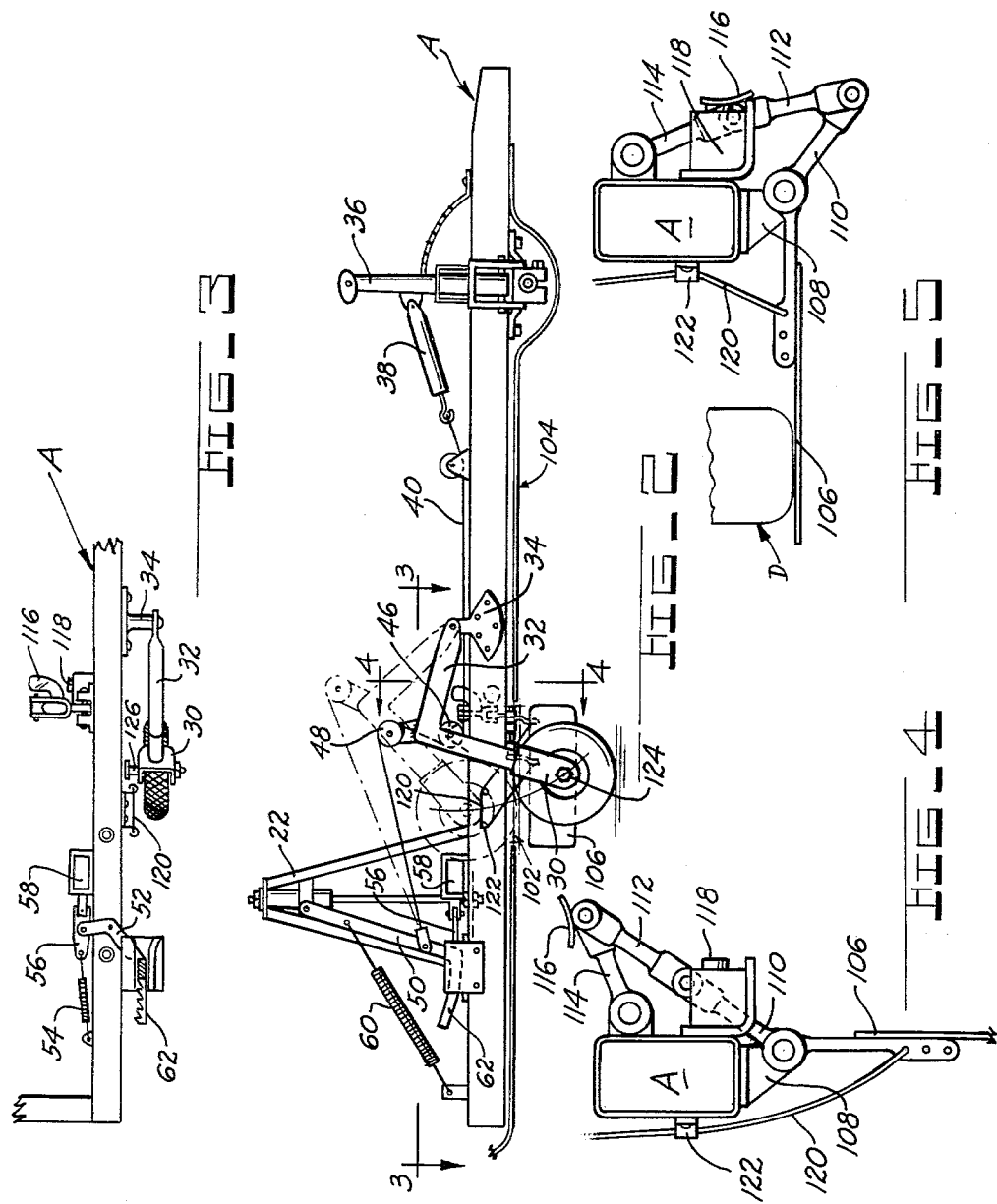

Feb. 22, 1966          L. E. AUSTIN          3,236,323
VEHICLE STABILIZING SYSTEM
Filed Nov. 20, 1962          7 Sheets-Sheet 3
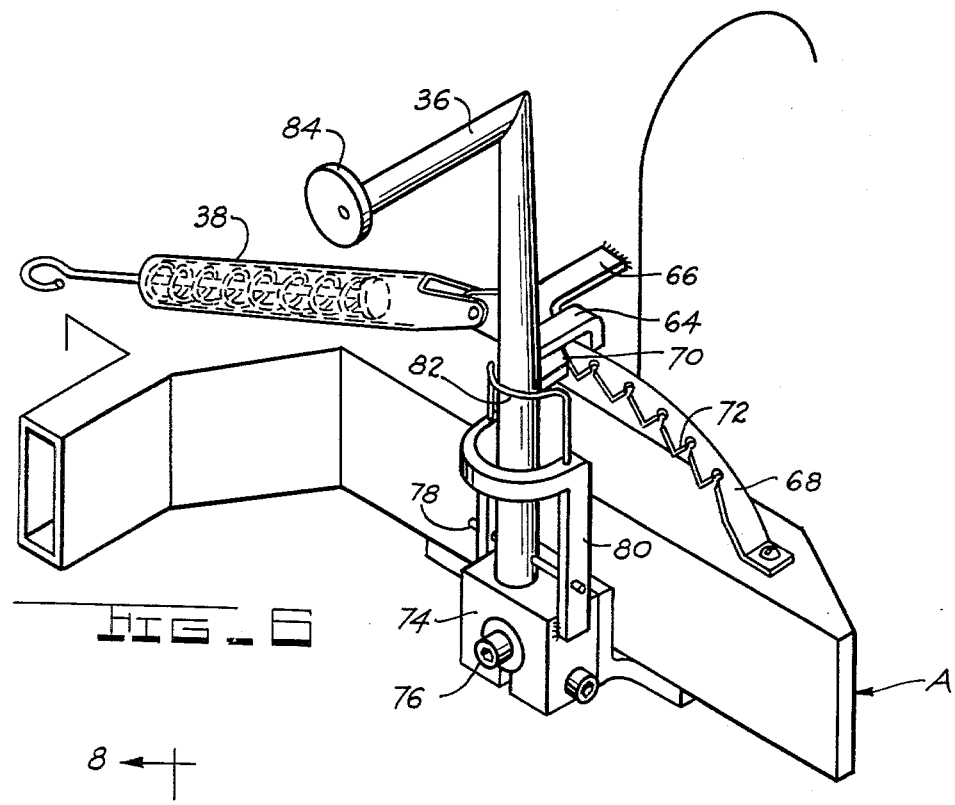
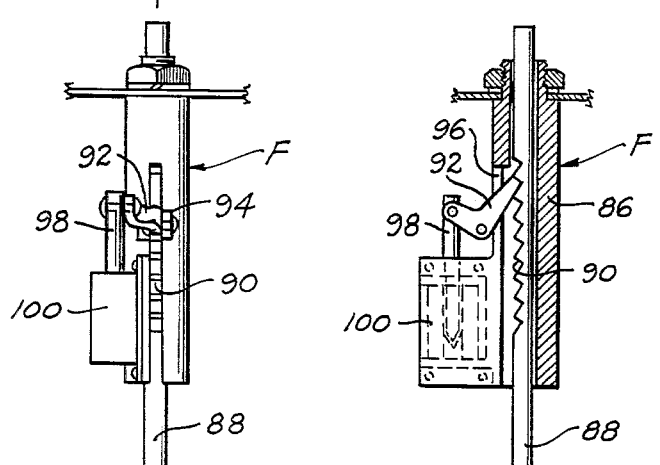
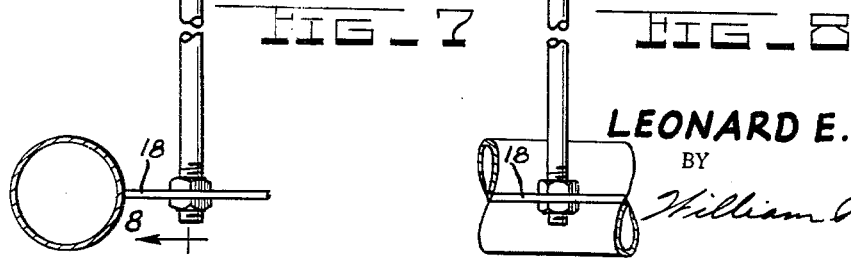
INVENTOR.
LEONARD E. AUSTIN.
BY
William P. Hickey
ATTORNEY.

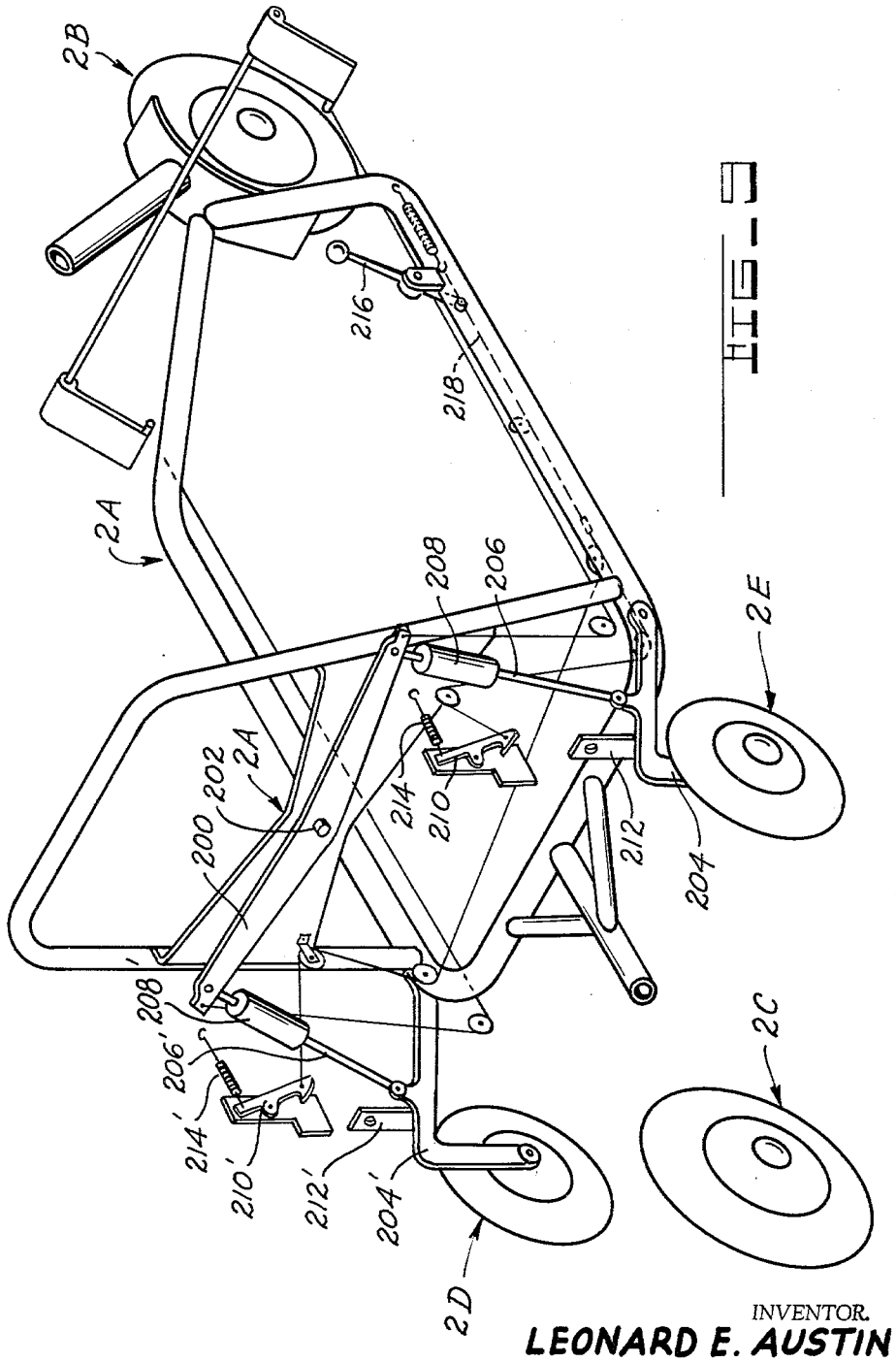

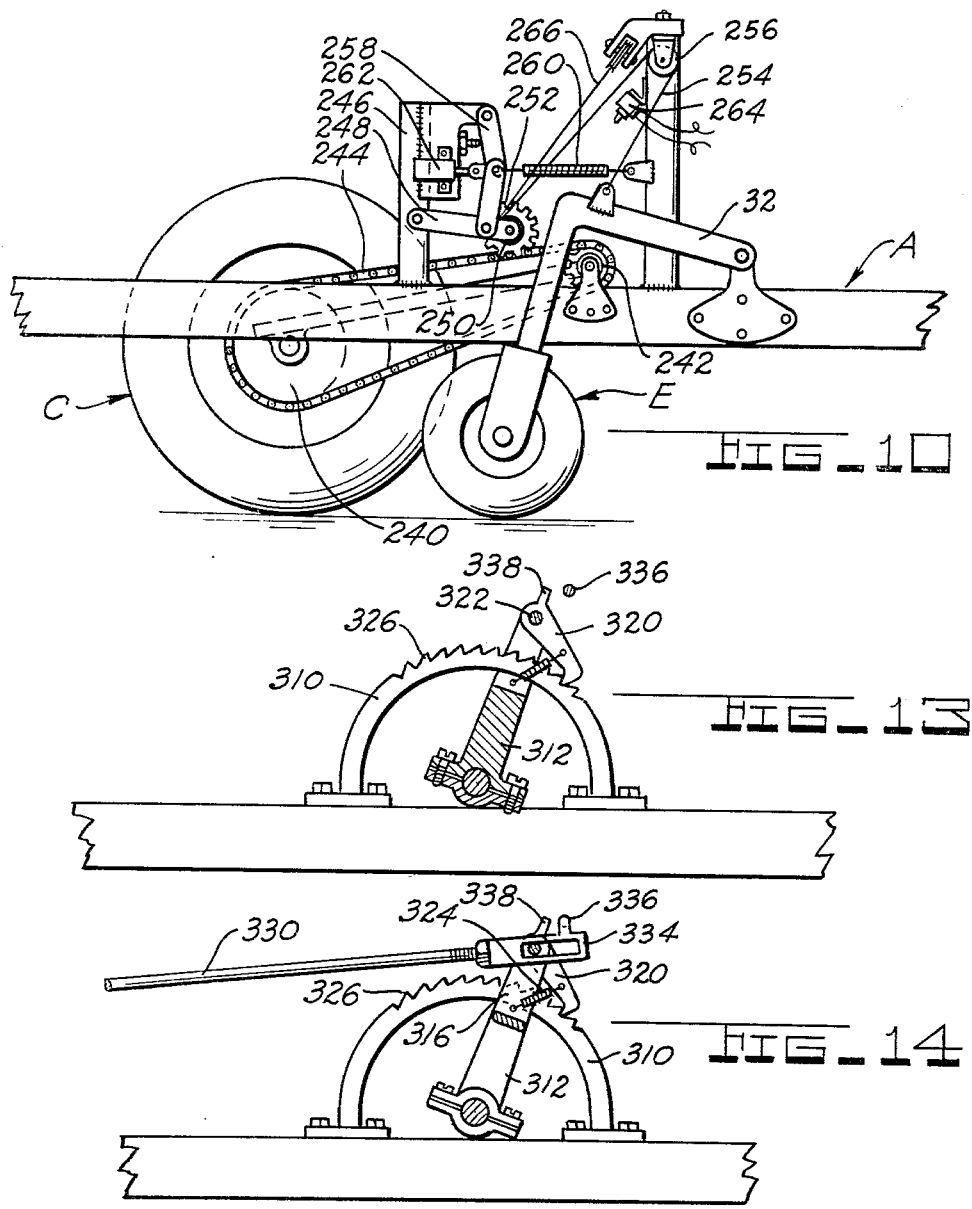

Feb. 22, 1966 L. E. AUSTIN 3,236,323
VEHICLE STABILIZING SYSTEM
Filed Nov. 20, 1962 7 Sheets-Sheet 6
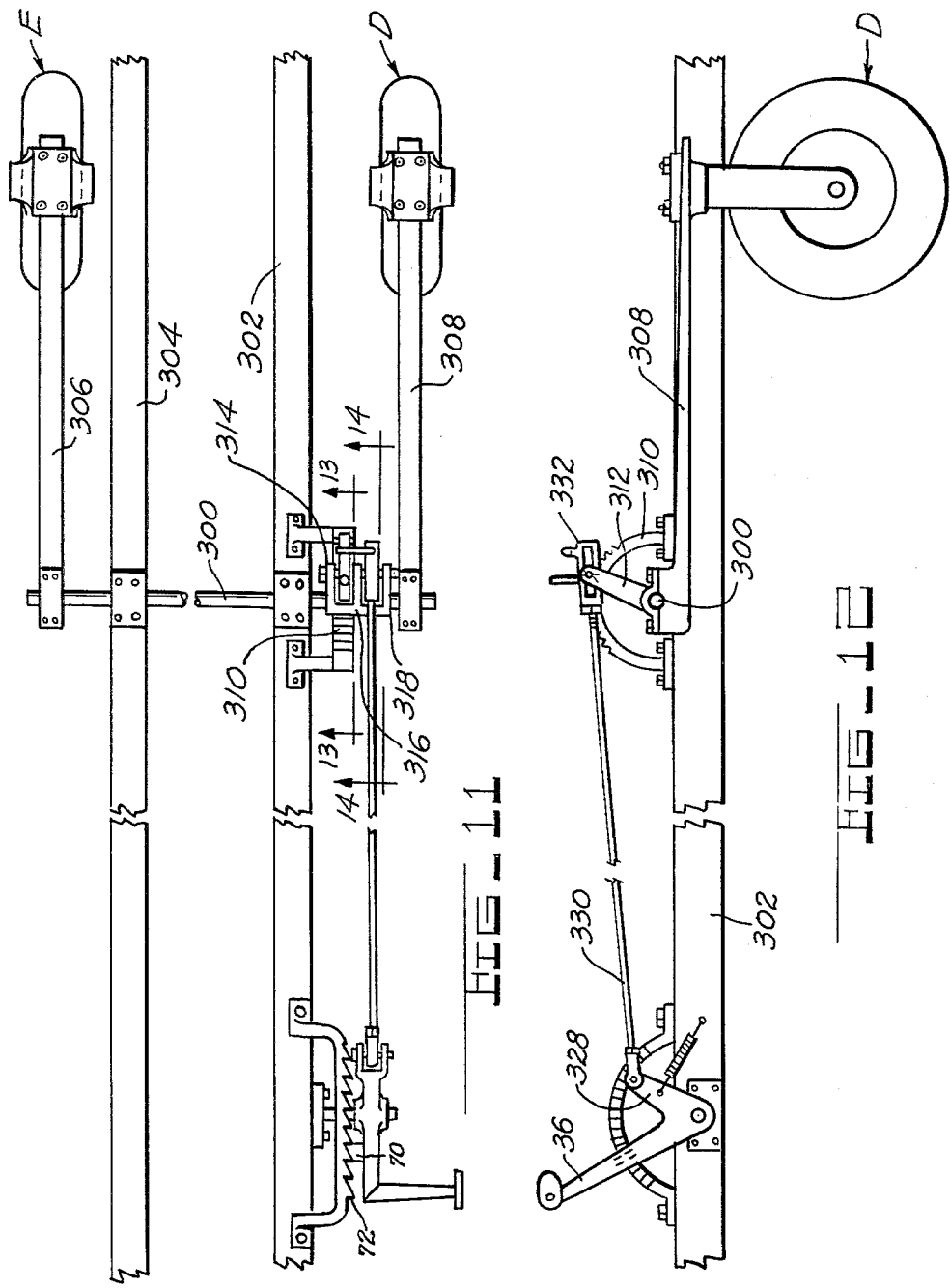
INVENTOR.
LEONARD E. AUSTIN.
BY
*William P. Hickey*
ATTORNEY.

Feb. 22, 1966 L. E. AUSTIN 3,236,323
VEHICLE STABILIZING SYSTEM
Filed Nov. 20, 1962 7 Sheets-Sheet 7
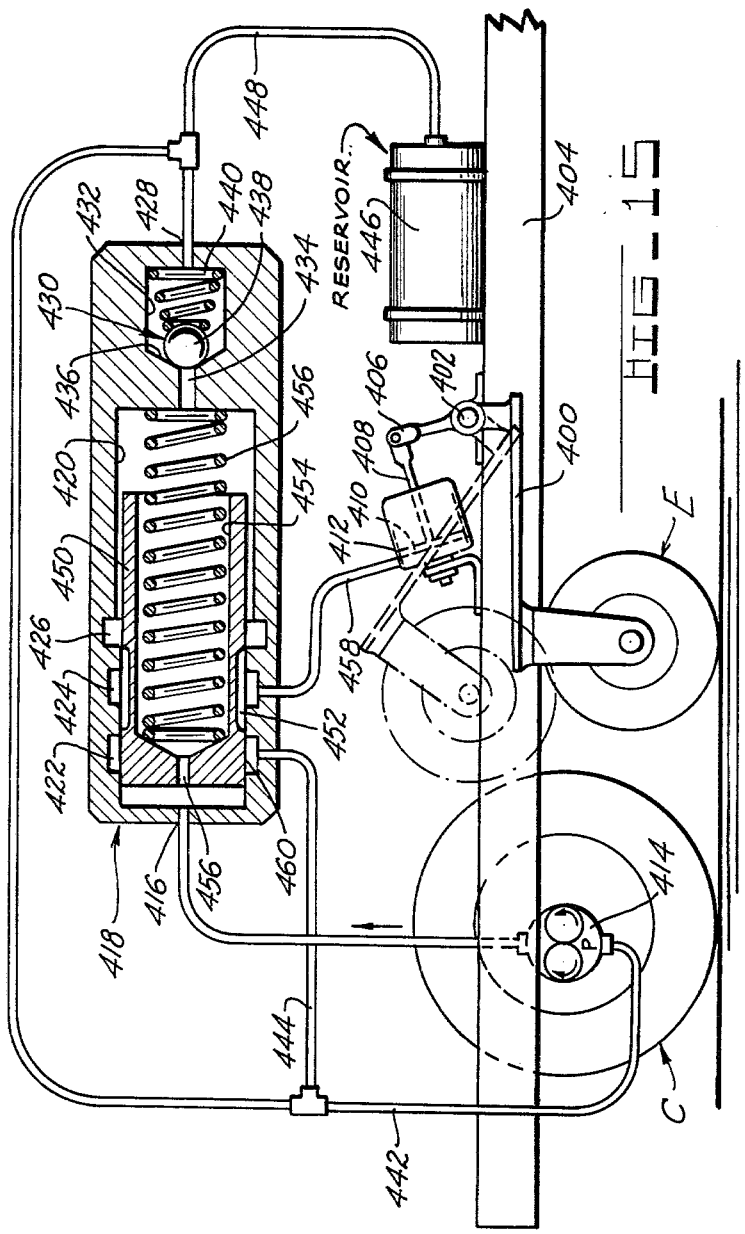
INVENTOR.
LEONARD E. AUSTIN.
BY
William P. Hickey
ATTORNEY.

United States Patent Office 3,236,323
Patented Feb. 22, 1966

3,236,323
VEHICLE STABILIZING SYSTEM
Leonard E. Austin, South Bend, Ind.
(512 S. Cortez St., Apt. 1, Prescott, Ariz.)
Filed Nov. 20, 1962, Ser. No. 238,969
16 Claims. (Cl. 180—30)

The present invention relates to a vehicle having very low road and air resistance; and more particularly to a vehicle having a pair of in-line wheels upon which the load of the vehicle is balanced.

An object of the present invention is the provision of a new and improved vehicle having very low air and road resistance which is very economical to operate and capable of high speeds.

Another object of the present invention is the provision of a new and improved means for stabilizing a vehicle of the type having a pair of in-line wheels upon which the vehicle's load is balanced.

A further object of the invention is a provision of a new and improved vehicle of the above mentioned type whose stabilizing system utilizes a pair of out-rigger wheels when they are locked into ground engagement will permit limited rocking movement of the vehicle.

A further object of the present invention is the provision of a new and improved means for operating the above mentioned out-rigger wheels utilizing a pair of pedals and motion transmission means which independently bias the out-rigger wheels against the road.

A further object of the present invention is the provision of a new and improved stabilizing system of the above mentioned type which can be locked in any vertically adjusted position of the vehicle.

A still further object of the present invention is the provision of a new and improved wheel well door closing system which includes a simplified arrangement for closing the wheel well doors when the auxiliary wheels are retracted.

A still further object of the present invention is the provision of a new and improved stabilizing system for the auxiliary wheels utilizing a pedal and cable arrangement, and which cable arrangement can be easily released from an actuating condition to allow extension of the cables and thereby permit the auxiliary wheels to be retracted up into the vehicle.

A still further object of the present invention is the provision of means which, during cornering of the vehicle, prevents at least one of the main suspension springs from continuing to exert its full load upon the ground to produce a tipping force upon the vehicle.

The invention resides in certain constructions and combinations and arrangements of parts; and further objects and advantages of the present invention will become apparent to those skilled in the art to which it relates from the following description of several preferred embodiments described with reference to the accompanying drawings forming a part of this specification and, in which:

FIGURE 2 is a side elevational view of the suspension system shown in FIGURE 1 but excluding the main load bearing wheels;

FIGURE 3 is a fragmentary plan view of a portion of the suspension system shown in FIGURE 2;

FIGURE 4 is a fragmentary view of the wheel well door and its actuating and locking mechanism by means of which the wheel well door is held closed, and the wheels are held in their retracted position;

FIGURE 5 is a fragmentary elevational view similar to FIGURE 4 excepting that the wheel well closure door is shown in its closed position;

FIGURE 6 is a diametric view of one of the pedal lever arrangements shown in FIGURE 1 by means of which the vehicle is held in its vertical position at low speeds;

FIGURE 7 is a fragmentary elevational view taken approximately on the line 7—7 of FIGURE 1;

FIGURE 8 is a side elevational view of the view shown in FIGURE 7;

FIGURE 9 is another embodiment of the out-rigger wheel suspension and control system of the present invention;

FIGURE 10 is a fragmentary side view showing one embodiment of automatic means for raising the auxiliary wheels;

FIGURE 11 is a fragmentary plan view of another embodiment of auxiliary wheel supporting and raising structure;

FIGURE 12 is a side elevational view of the structure shown in FIGURE 11;

FIGURE 13 is a fragmentary sectional view taken on the line 13—13 of FIGURE 11;

FIGURE 14 is a fragmentary sectional view taken on the line 14—14 of FIGURE 11; and FIGURE 15 is a schematic view of a hydraulically actuated auxiliary wheel raising system.

Figure 1:
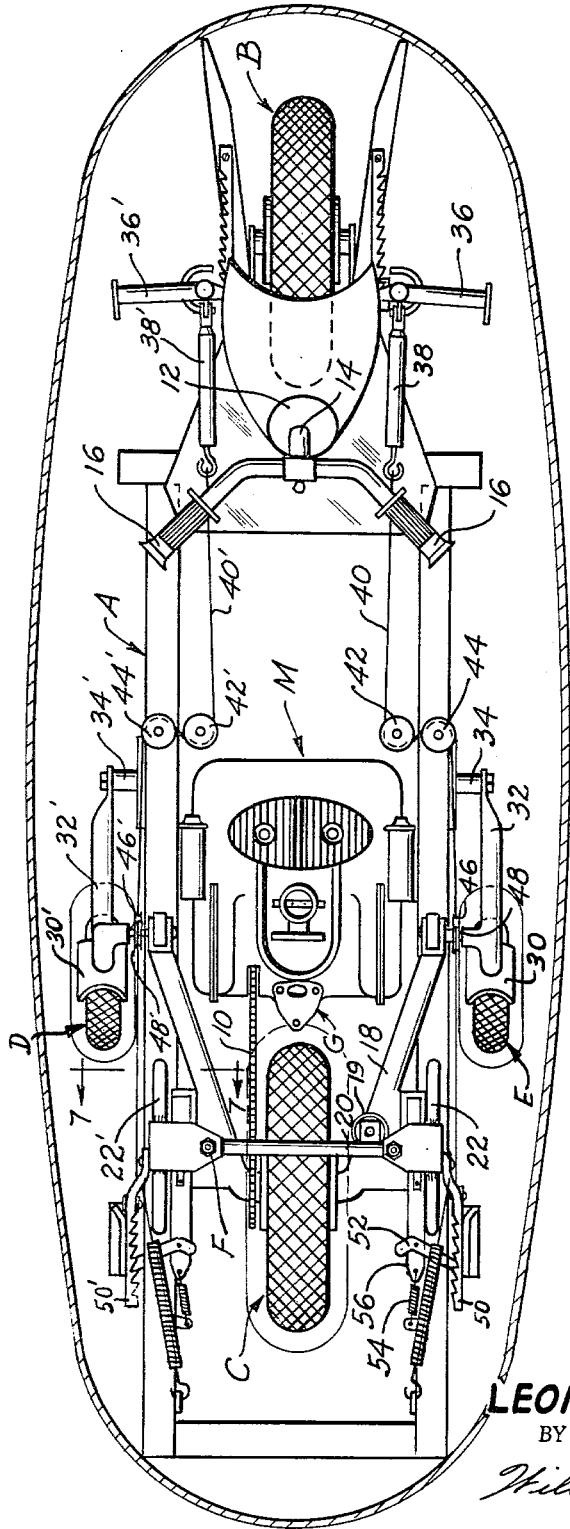
FIGURE 1 is a plan view of an automotive vehicle embodying principles of the present invention, the vehicle having its streamline body removed to better illustrate the functioning of its suspension system.

The motor vehicle shown in FIGURE 1 generally comprises a frame A having front and rear main bearing wheels B and C which are located on the vertical centerline of the vehicle which passes through its center of gravity. The vehicle also includes a pair of auxiliary, or out-rigger, balancing wheels D and E which are positioned on respective sides of the vertical center plane for the purpose of maintaining the vehicle in a balanced position. The principles of the present invention are applicable to vehicles wherein either the front or the rear wheel is steerable; and in the embodiment shown in the drawing, the front wheel B is supported and steered in a manner generally conventional with present day motorcycles. The out-rigger wheels D and E may be made steerable; and when this is the case, they can be positioned anywhere lengthwise of the vehicle. In the embodiment shown in the drawing, however, they are made non-steerable in order to provide some measure of directional stability, and so are position a slight distance forwardly of the nonsteerable rear wheel C. In order to minimize wear on the nonsteerable auxiliary wheels D and E, the wheels D and E are positioned only a slight distance forward of the rear wheel C, so that only a slight amount of skidding of the auxiliary wheel is encountered during cornering of the vehicle. The auxiliary wheels D and E can in certain instances be hinged laterally and inwardly of their ground engaging position, so that the wheels will swing upwardly and inwardly into the vehicle; but in the embodiment shown in the drawing have been hinged at points positioned generally forwardly of the axis of the wheel, so that the auxiliary wheels D and E move generally upwardly in a vertical plane that is parallel to the vertical plane passing through the centerline of the load bearing wheels B and C. The manner in which the vehicle is power driven forms no part of the present invention and so will not be described in detail. Generally speaking, however, the vehicle is driven by means of a motor indicated at M. The motor has a sprocket, not shown, which drives a chain 10 leading to a sprocket that is directly connected to the rear wheel C of the vehicle.

As previously indicated the front wheel B can be mounted and steered in any convenient manner and as shown in the drawings is mounted on forks, only portions of which are show, and the center post of which extends up through a bell housing 12 that is secured to the frame A. The center post 14 is suitably journalled in the bell housing 12 and is actuated by means of a pair of handle grips 16— all in a manner that is generally conventional with respect to present day motorcycles.

As previously indicated, the rear wheel C can be mounted and driven in any convenient manner, and because the embodiment shown in FIGURE 1 is chain driven, its rear wheel C is mounted on a bracket 18 which is fixed at one end to the axle of the rear wheel C and which is pinned at its other end to the frame at an axis that is generally coaxial with respect to drive sprocket of the motor M. The rear wheel C therefore is free to swing up and down without any lengthening or shortening of the chain drive 10.

The front wheel B is yieldingly suspended by means of an articulated lower end of the forked structure, and a spring, not shown, that is positioned within the bell housing 12 and which forces the axle of the front wheel B down into firm ground engagement. The rear portion of the frame A can be spring supported from the rear wheel C in any convenient manner and as shown in the drawings is supported by a compression spring 19 that is positioned between the frame 18 and a horizontal bar 20 which extends laterally above the rear wheel C and is suitably fixed to the side portions of the frame A. Because the frame 18 is rigid, only one such spring is necessary.

The auxiliary wheels D and E are shown mounted by identical structures excepting that they are opposite hand. Parts of the support structure for the auxiliary wheel D will be designated by the same reference numeral as used to designate the corresponding parts of the auxiliary wheel E, excepting that a prime mark is affixed thereto. The axle of the wheel E is fastened between the legs of a U-shaped bracket 30 whose closed end portion is welded to one end of an L-shaped tubular leg 32 which extends upwardly and forwardly to a position where its other end is pivotably supported to a bracket 34 which in turn is attached to the frame A. The wheels D and E therefore are free to swing in a vertical plane that is parallel to the vertical plane which passes through the load bearing wheels B and C of the vehicle. The wheels D and E can be retracted up into the body of the vehicle or else they can be forced individually down into ground engagement for the purpose of balancing the vehicle as will later be explained.

According to the principles of the present invention, the wheels D and E are adapted to be biased downwardly into ground engagement with varying degrees of force so as to balance the vehicles upon the center load bearing wheels B and C. The auxiliary wheels D and E may be actuated either manually or may be power driven in any suitable manner. The control or degree of actuation of the auxiliary wheels D and E likewise can be had in any suitable manner, and in the embodiment shown in the drawing is controlled by means of a pair of identical but opposite hand foot pedals 36 and 36'. Inasmuch as the control mechanisms operated by the pedals 36 and 36' are identical but opposite hand, only one of the systems will be described in detail, and it will be understood that the portions of the other system are identical but opposite hand, and are accordingly numbered by identical reference numerals characterized further in that a prime mark is affixed thereto. The foot pedal 36 operates a spring loading device 38 which in turn operates a cable 40 that extends around fixed pulleys 42 and 44 that are spaced laterally apart on the frame. The cable then extends back to a vertical pulley 46 and up over a pulley 48 that is affixed to the upper portion of the L-shaped tubular leg 32 that supports the auxiliary wheel E. It will, therefore, be seen that the depressing of the foot pedal 36 pulls the pulley 48 that is attached to the leg support for the auxiliary wheel E down into ground engagement to prevent the vehicle from tipping to the right; and in similar fashion, pedal 36' actuates the auxiliary wheel D to prevent the vehicle from tipping to the left.

According to further principles of the present invention, the auxiliary wheels D and E are made to be retractible up into the body so as to reduce air and road drag of the vehicle at cruising speeds. In order that the cables 40 and 40' can be actuated with a minimum of movement of the pedals 36 and 36', respectively, the portions of the cable which extend over the pulleys 48 and 48' are fixed to releasable anchors 50 and 50', respectively. While any suitable releasable anchor might be used, the anchors 50 and 50' of the preferred embodiment comprises levers which are hinged adjacent the top of the A-frame 22. The bottom end of the levers extends past the respective side edges of the frame A. In order that the adjustable anchor can be rigidly held in its rearward position wherein the wheel E can be biased downwardly into ground engagement, some convenient type of retaining or latching mechanism is used which can be easily released to permit the anchors 50 and 50' to swing to their forward positions wherein the legs 32 and 32' can swing upwardly into the dot-dash position shown in FIGURE 2.

In the embodiment shown in the drawings, and L-shaped pawl or dog 52 is pinned to the frame A adjacent its mid point so that its outer end extends into the path of the adjustable anchor lever 50. Forward movement of the pawl 52 is prevented by suitable stops not shown which is positioned outwardly of the pivot point of the pawl. The pawl 52 is normally biased into the clamping or stopping position of the adjustable lever anchor 50 by means of a spring 54 one end of which is suitably affixed to the frame and the other end of which is affixed to an articulated link 56. The other end of the link 56 is suitably pinned to the armature of a solenoid 58. A coil spring 60 is used to bias the adjustable lever to its rearward position; and as a matter of safety, and to be sure that the adjustable anchor 50 will be caught and held even though it should not be biased back into its rearward most position, the bottom end of the lever 50 is provided with a rearward projection 62 which is provided with a plurality of teeth adapted to be caught by the dog 52.

The foot pedal lever 36 is adapted to be moved forwardly from a rearwardmost position wherein an abutment 64 contacts the rearwardmost abutment 66 of a latch quadrant 68 to a number of forward adjusted positions wherein the inwardly projecting dog 70 of the pedal 36 engages one of the teeth 72 of the latch quadrant 68. In order that the pedal 36 can be freely moved forwardly, the bottom end of the pedal is carried in a journaling block 74 that is suitably journaled about a horizontal shaft 76 that is affixed to the frame A; and in order that the pedal 36 can swing freely inwardly and outwardly over the teeth 72, the bottom end of the pedal 36 is pivoted about the longitudinally extending pin 78 that extends through an upwardly extending bracket 80 that is welded to the front and rear sides of the journaling block 74. The upper end of the bracket 80 comprises a U-shaped strap which extends around the outside of the pedal 36 and a U-shaped spring 82 is fastened to the block 74 to bias pedal 36 inwardly into engagement with the teeth 72. In order that the operator's foot can bias the pedal 36 outwardly against the spring, and retract the pedal around one of the teeth, a side plate 84 is welded to the outside edge of the pedal so as to be caught by the side edge of the operator's foot.

When the pedal is in its rearwardmost position and its retaining abutment 64 is in engagement with the abutment 66, the auxiliary wheel E will be biased into engagement with the ground with just sufficient force so as to balance the vehicle A with most of the load being carried by the main wheels B and C. In this position the spring loading device 38 will be in its extended preloaded position so as to permit a certain amount of rocking action of the vehicle. This will permit a certain amount of rocking and moving the vehicle over uneven terrain at low speeds.

When the spring within the spring loading device 38 is fully compressed, however, a greatly increased resistance to rocking action is had so as to prevent the vehicle from tipping completely over.

During severe cornering of the vehicle when the spring loading device is completely compressed, a good deal of the vehicle's weight will tend to be supported by one of the auxiliary wheels D or E, depending upon the direction of turn; so that the main load carrying springs between the main wheels C and B and the frame A will cause these wheels to extend outwardly of the frame tending to further unbalance the vehicle. In order that this can be prevented, the vehicle shown in the drawing is equipped with an extension limiting coupling F between the upper portion of the A-frame 22 and the load bearing axle of the wheel C. The extension limiting coupling F generally comprises a tubular sleeve 86, the upper end of which is provided with a reduced diameter portion that is threaded and bolted to the top part of the A-frame 22. The coupling also includes a cylindrical rod 88, the lower end of which is suitably bolted to the rear axle arm 18 in such manner as to extend up through the tubular sleeve 86. The rod 88 is provided with a plurality of downwardly facing teeth 90 which are adapted to be engaged by an L-shaped pawl 92 which is suitably pivoted adjacent its center point to a pair of ears 94 that are welded to the outside of the tubular sleeve 86. The pawl 92 extends inwardly through a suitable opening 96 in the tubular sleeve 86 and the outer end of the pawl 92 is adapted to be moved downwardly to swing the pawl out of engagement with the rod 88 by means of the armature 98 of an electrical solenoid 100. The solenoid 100 is provided with a spring which biases the armature 98 upwardly to swing the pawl 92 into engagement with the rod 88 when it is deenergized, and the solenoid 100 is adapted to be energized in a manner later to be explained at low vehicle speeds or during a skid when the rear wheel slides.

As previously indicated, the vehicle as shown in the drawing is intended to have very low air resistance so that its auxiliary wheels D and E are made retractible through suitable openings 102 in the lower belly panel 104 of the body. According to further principles of the present invention the opening 102 is conveniently closed off by means of a wheel-well door 106 which acts as a wheel support platform and whose weight will normally hold it in an open position. The door 106 is hinged to the frame A by means of a bracket 108, and the door 106 is provided with a lever 110 extending at an obtuse angle relative to the door 106 for the purpose of holding the door in its closed position. The lever 110 is held in its door-closing position by means of a pair of toggle linkages 112 and 114. The lower end of the toggle link 112 is pinned to the lever 110, the upper end of the toggle linkage 114 is suitably pinned to the frame, the adjacent ends of the toggle linkages are pinned to each other. The toggle linkages 112 and 114 are of such length as to just approach their over-center position when the door 106 is closed, and in this closed position a suitable armature 116 that is affixed to the lower end of the upper link 114 abuts a solenoid 118. When the solenoid 118 is energized, toggle linkages 112 and 114 are held in the position which approaches their over-center position, so that the door remains closed with very little holding force required by the electromagnet.

The actual closing of the door 106 is affected by means of a U-shaped cable, the ends of which are fastened to the door at spaced apart points, and the upper U-shaped portion of which extends between a pair of spaced apart guides 122 affixed to the frame A. The axle 124 for the auxiliary wheel E is provided with an inwardly extending portion 126 adapted to pass between the guides 122 and pick up the upper U-shaped portion of the cable 120 during its upward movement as the wheel is retracted. The wheel may be retracted in any suitable manner as by means of hydraulic cylinders, air cylinders, etc., and in the embodiment shown in the drawing it is intended that the operator will reach back and grasp the tubular leg 32 and swing the wheel upwardly into the body of the vehicle. It is understood that the wheel D is similarly operated.

It is believed that the operation of the vehicle above described will be well understood by those skilled in the art, and in the normal at rest condition of the vehicle, the auxiliary wheels D and E will be in ground engagement to support the vehicle upright. While the wheels D and E are in ground engagement, the vehicle is firmly supported in its upright position so that no balancing by the operator need take place to maintain the vehicle upright. At some predetermined speed, say 10 miles per hour, the electrical circuit energized by the governor switch G causes the solenoid 100 to become energized so as to uncouple the rear wheel C from the frame and thereby permit a free and easy ride. At the same time the governor switch G energizes the solenoid 118 to hold the doors 106 closed when the wheels are retracted. The governor switch G at the same time energizes the solenoid 58 to allow the adjustable anchors 50 to move into their forward positions and thereby permit the wheels D and E to be retracted. The operator manually lifts the L-shaped tubular legs 32 and 32' one at a time and swings them upwardly into the vehicle which, as previously explained, causes the inwardly extending portion 126 of the axles to contact the U-shaped portion of the cable 120 and thereby swing the doors 106 and 106' to their closed positions.

When the vehicle is being brought to a standstill and the vehicle slows down to a speed of approximately 10 miles per hour, or when the rear wheel skids such that its speed of rotation is less than that corresponding to 10 m.p.h., the governor switch G deenergizes the circuit including the solenoids 118 and 118', 58 and 58', as well as the solenoid 100. This automatically allows the wheels D and E to drop, and the adjustable anchors 50 and 50' to swing back to their rearwardmost position wherein the cables 40 and 40' become operable to balance the vehicle. If the operator should actuate one of the pedals 36 or 36' before the adjustable anchors have moved all the way to the rearwardmost position, or if the vehicle were tilted in a turn, or on a steeply crowned road, it will be seen that the pawls 52 will engage an intermediate portion of the adjustable anchor 50 and will thereby be operable to permit the cables 40 and 40' to bias the appropriate auxiliary wheel down into ground engagement. If the operator does not actuate the foot pedal levers at this time, the adjustable anchors 50 and 50' will move all of the way to their most rearwardly positions and full travel can be obtained. At the same time the pawl 92 of the extension limiting coupling F engages the teeth 90 of the cylindrical rod 88; so that if it should be necessary to bank the vehicle sharply, no overturning movement will be had by means of the spring effect of the main suspension system. If the road is uneven or the operator should desire to adjust his balancing of the vehicle, he can operate either one of the foot levers 36 or 36' by merely depressing the appropriate one. If, for example, he is banking over into a turn and he desires to right the vehicle to some degree, he may push the appropriate foot pedal lever 36 or 36', as the case may be, on the inside of the turn to straighten up the vehicle. If the road is somewhat uneven, he can push the pedal on the low side of the vehicle to extend the appropriate auxiliary wheel and thereby maintain the vehicle upright. As previously indicated, the foot pedal levers 36 are made to be positioned in any one of a number of forward positons wherein the dog 70 engages one of the teeth 72 of the latch quadrant 68 to maintain the vehicle in the adjusted position. If it should be desired to change the tire on the rear wheel C of the vehicle both levers 36 and 36' can be moved forwardly to jack the rear wheel C out of ground engagement.

In addition there is a panic button, not shown, on the handle bars which is capable of deenergizing the solenoids 118 and 118', 58 and 58' and 100 which allows the wheels to drop, and the pedals to become operative. If, for example, a stretch of icy pavement were being approached, the panic button could be pushed so that all four wheels would engage the ground. Thereafter, greater stability is provided than with a conventional four wheeled vehicle, since the vehicle can tip into the curve slightly and thereby require a greater overturning force than with a conventional upright vehicle.

Still other embodiments of the principles of the present invention can be made. The embodiment shown in FIGURE 9 is one other of these embodiments and differs from the previously described embodiment principally in that its auxiliary wheels 2D and 2E are tied together by means of a cross bar 200 suitably pinned to the frame 2A as by means of the pin 202. The wheels 2E and 2D are pivotally supported by means of L-shaped arms 204 and 204', the forward end of which is suitably pivotally connected to the frame 2A. The lower end of the foreshortenable linkages 206 and 206' is connected to the respective arms 204 and 204', and the upper end of the foreshortenable linkages 206 and 206' are connected to opposite ends of the cross bar 200. The foreshortenable linkages are provided with air cylinders 208 and 208' having suitable pistons and piston chambers therein to lower the arms 204 and 204' into ground engagement when air pressure is admitted thereto. In the extended position the wheels 2D and 2E will resiliently engage the ground to normally accommodate minor irregularities such as bumps and the like. If the road upon which the vehicle is traveling is crowned so that the surface of the road on one side of the vehicle is higher than on the other, one of the wheels will move upwardly to tilt the cross bar 200 and thereby extend the other wheel downwardly to provide firm road engagement. It will be seen that the frame of the vehicle is supported on the cross arm 200 adjacent its mid point by means of the pin 202, and inasmuch as this point will normally be about the center of gravity, the vehicle will normally be hung off of the cross arm 200 to permit a cradling action about the pin 202.

The wheels 2D and 2E are also intended to be retractible and in order that this can be accomplished, the air pressure that is normally supplied to the air cylinders 208 and 208' is released to permit the piston chambers to be collapsed. This allows the L-shaped arms 204 and 204' to be swung upwardly and to be held in an upward position by means of a pair of latches 210 and 210' the bottom ends of which engage suitable brackets 212 and 212' on the arms 204 and 204', respectively. The latches 210 are normally biased into a position to engage the brackets 212 and 212' respectively by means of suitable coil springs 214 and 214'.

When it is desired to release the wheels into ground engagement from the retracted position, the operator of the vehicle actuates a lever 216 which in turn actuates a cable 218 having portions leading to both of the latches 210 and 210' to release the brackets 212 and 212' and allow the wheels 2D and 2E to fall into ground engagement. At the same time actuation of the lever 216 operates suitable valving, not shown, to charge the air cylinders 208 and 208' with a predetermined amount of air pressure as will be well understood by those skilled in the art.

While the auxiliary ground engaging wheels of the previously described embodiments have been described as being raised manually, it is intended that power means will be provided on the more expensive models of the car for raising the auxiliary wheels. The embodiment of power lifting means shown in FIGURE 10 is shown mounted on the first described embodiment of the vehicle. A chain sprocket 240 is attached to the wheel C and an idler sprocket 242 is mounted to the frame A. An endless chain 244 extends around the sprockets 240 and 242. A vertical support 246 is welded to the frame A and the rear end of an arm 240 is pivotally fastened thereto. A winding drum 250 and sprocket 252 are rotatably supported on the front end of the arm 248 in such position that the sprocket 252 can move down into engagement with the chain 244 to rotate the drum 250. A cable 254 is wound around the drum, up over a pulley 256 suitably secured above the L-shaped tubular leg 32 which supports the auxiliary wheel E and is then fastened to the L-shaped leg 32. When the drum 250 rotates therefore, the auxiliary wheel E is raised up into the vehicle.

Control of the raising of the auxiliary wheel E is had by means of a toggle 258 the lower end of which is pinned to the arm 248 and the top end of which is suitably fixed to the top of the support 246. A tension spring 260 is connected to the center of the toggle 258 to collapse the toggle 258 to normally hold sprocket 252 out of engagement with the chain. At a speed above a predetermined speed, the governor of the vehicle energizes the solenoid 262 to extend the toggle and move the sprocket 252 into engagement with the chain 244 to rotate the drum 250. When the auxiliary wheel E is fully retracted, the arm 32 contacts a limit switch 264 to de-energize the solenoid 262. At this time, however, the wheels are held in their up position by the door 106 previously described. The auxiliary wheel D is raised simultaneously with the auxiliary wheel E by a second cable 266 which is operated in the same manner as cable 254.

A third embodiment of vehicle suspension system is shown in FIGURES 11 and 12. In the embodiment shown in FIGURES 11 and 12 a cross shaft 300 is suitably journaled to the longitudinal frame members 302 and 304. The forward ends of a pair of leaf springs 306 and 308 are fixed to the respective opposite ends of the cross shaft 300, and the rear ends of the leaf springs 306 and 308 carry the auxiliary wheels E and D.

The auxiliary wheels E and D are adapted to be latched down into ground engagement by a semi-circular ratchet 310. The shaft 300 is provided with an upwardly extending arm 312 positioned directly below the ratchet 310. The upper end of the arm branches laterally below the ratchet and carries three upwardly extending fingers 314, 316 and 318. The fingers 314 and 316 extend upwardly past opposite sides of the ratchet 310, and an L-shaped pawl 320 is pivotally connected between the fingers 314 and 316 over the top of the ratchet 310 by a bolt 322. The pawl is biased down into engagement with the ratchet by means of a small coil spring 324. When the pawl engages the rearwardly facing teeth 326 the leaf springs 306 and 308 cannot swing vertically and the wheels D and E are held into ground engagement.

The wheels are adapted to be raised by a foot pedal level arrangement 36 identical with that previously described excepting that it is provided with an arm 328 to which the forward end of a rod 330 is pivoted. The rear end of the rod 330 is provided with an elongated member 332, positioned between the fingers 316 and 318. The elongated member has a slotted opening 334 therethrough through which the bolt 322 extends. The top surface of the elongated member has a horizontal latch release 336 which is adapted to engage a projection 338 on the pawl 320 to raise the pawl out of engagement with the ratchet 310 during forward movement of the rod 330. Continued forward movement of the rod 330 causes the rear end of the slotted opening 334 to abut the pin 322 to move the arm 312 forwardly and thereby raise the auxiliary wheels D and E. The wheels can be held in any appropriate or adjusted raised position by the dog 70 to engage an appropriate one of the teeth 72. By releasing dog 70 from the teeth 72, the wheels D and E fall down and the L-shaped pawl engages an appropriate tooth 326 of the ratchet 310.

It is also possible to raise the wheels hydraulically. In the embodiment shown in FIGURE 15, the auxiliary wheel E is shown mounted on the rear of a leaf spring 400 and the front of the leaf spring is fixed to a cross shaft 402 in the same general manner as shown in FIGURE 11. The cross shaft 402 extends across the top of the frame members 404, only one of which is shown. The cross shaft 402 has an upstanding arm 406 fixed thereto, and the arm is adapted to be moved forwardly by the piston rod 408, carried by the piston 410 of a hydraulically cylinder 412. The hydraulic cylinder is suitably pivotally mounted on the frame 404, so that when hydraulic pressure is supplied to the back of the piston 410 the shaft 402 is rotated and both auxiliary wheels are raised.

Hydraulic pressure for actuating the system is supplied by a hydraulic pump 414 suitably supported and geared from the axle of the wheel C so that its rotary gears are moved in the direction indicated in FIGURE 15 whenever the vehicle is moving. Pressure fluid therefore proceeds out of the top of the pump 414 to the inlet 416 and control valve 418. The control valve 418 has a longitudinally extending chamber 420 therein with a return port 422, a control port 424, and a pressure port 426 spaced apart in that order from the inlet 416. An outlet 428 is provided on the opposite end of the valve from its inlet and a suitable back pressure valve 430 is provided between the chamber 420 and the outlet to maintain a back pressure in the chamber 420. The back pressure valve 430 is formed by an enlarged valve chamber 432 in the passage 434 between the chamber 420 and the outlet 428 which enlarged valve chamber forms a valve seat 436 which faces the outlet 428. The back pressure valve is completed by a ball valve 438 which is biased against the seat by a coil spring 440.

The suction side of the pump is connected to the return port 422 by conduits 442 and 444, and conduit 442 continues on to the outlet port 428. A reservoir 446 is connected to conduit 442 by conduit 448. The valve is completed by a cylindrical valve member 450 in the chamber 420. The valve member 450 has a groove 452 in its surface which has an axial length less than the spacing between the return port 422 and the pressure port 426. The end of the valve member 450 opposite the inlet end is bored out as at 454 and a coil spring 454 positioned therein to bias the valve member 450 adjacent the inlet 416. A small flow through orifice 456 is provided through the valve member 450 so that as flow commences above a predetermined rate the valve is moved to the right.

When the valve is adjacent the inlet end of the chamber 420, the groove 452 communicates the control port 424 to the return port 422. Control port 424 is communicated to the rear side of the piston 410 by line 458 so that at this time the wheels are on the ground. At slow flows, oil flows through orifice 456 through passage 434 to lift ball 438 off of seat 436 to the return line 442. At speeds above a predetermined rate sufficient differential pressure is produced across orifice 456 to move valve 450. As the valve 450 is moved, it closes off return port 422. Thereafter, land 460 closes off the return port 422, and thereafter groove 452 communicates pressure port 426 to the control port 424 to raise the wheels. The portion of the chamber 420 to the right of pressure port 426 is of larger size than the valve 450 to permit back pressure to flow to the pressure port 426. At large flow rates of the pump 414, the valve 450 is biased to the right of return port 422 to permit large flows to return to the pump suction. The constant back pressure created by valve 430 holds the piston 410 bottomed on the front end of the cylinder to hold the wheels in their fully raised position.

It will be apparent that the objects heretofore enumerated, as well as others, have been accomplished, and that there has been provided a new and improved vehicle suspension system wherein the vehicle is not only suspended from a pair of load supporting wheels but is balanced by a pair of auxiliary outboard wheels through suitable mechanism which permits the operator to extend or retract the outboard wheels as he sees fit.

While the invention has been described in considerable detail, I do not wish to be limited to the particular embodiments shown and described; and it is my intention to cover hereby all novel adaptations, modifications, and arrangements thereof which come within the practice of those skilled in the art to which the invention relates.

I claim:

1. An automotive vehicle of the type having a forwardly and rearwardly extending body and a forwardly and rearwardly extending imaginary plane passing through the center of gravity of the vehicle, said vehicle comprising: a pair of main ground engaging wheels consisting of a front wheel and a rear wheel mounted in said imaginary plane, the respective wheels being mounted forwardly and rearwardly of said center of gravity, first means biasing said rear wheel and body apart to yieldably support body, a left auxiliary ground engaging balancing wheel and a right auxiliary ground engaging balancing wheel positioned on their respective sides of said imaginary plane, each of said auxiliary wheels being connected to and being extensible from said body, second means for individually extending said auxiliary wheels to balance said vehicle on said main wheels, and means for automatically restraining said first means from moving said rear wheel and body apart during a skid of said rear wheel.

2. An automotive vehicle of the type having a forwardly and rearwardly extending body and a forwardly and rearwardly extending imaginary plane passing through the center of gravity of the vehicle, said vehicle comprising: a pair of main ground engaging wheels consisting of a front wheel and a rear wheel mounted in said imaginary plane, the respective wheels being mounted forwardly and rearwardly of said center of gravity, first means biasing said rear wheel and body apart to yieldably support said body, a left auxiliary ground engaging balancing wheel and a right auxiliary ground engaging balancing wheel positioned on their respective sides of said imaginary plane, each of said auxiliary wheels being connected to and being extensible from said body from retracted positions, a pair of pedals individual ones of which operate individual ones of said auxiliary wheels, said pedals having a normal position with a predetermined limit of travel from said normal positions, second means for causing an initial movement of said auxiliary wheels from their retracted positions to ground engagement without moving said pedals out of their normal positions, third means for interconnecting each auxiliary wheel to a respective pedal after said initial movement of said auxiliary wheels in a manner permitting movement of the pedal from said normal position to thereafter produce a force moving said auxiliary wheels downwardly regardless of the amount of initial movement required for said auxiliary wheels to initially engage the ground, fourth means which when operated restrains movements of said rear wheel away from said body, and means for automatically actuating said second, third and fourth means during a skid of said rear wheel.

3. An automotive vehicle of the type having a forwardly and rearwardly extending body and a forwardly and rearwardly extending imaginary plane passing through the center of gravity of the vehicle, said vehicle comprising: a pair of main ground engaging wheels consisting of a front wheel and a rear wheel mounted in said imaginary plane, the respective wheels being mounted forwardly and rearwardly of said center of gravity, first means biasing said rear wheel and body apart to yieldably support said body, a left auxiliary ground engaging balancing wheel and a right auxiliary ground engaging balancing wheel positioned on their respective sides of said imaginary plane, each of said auxiliary wheels being connected to and being extensible from said body, a pair of pedals individual ones of which operate individual ones of said auxiliary wheels and whereby operation of each pedal extends a respective auxiliary wheel to balance said vehicle, and means for automatically restraining movement of said rear wheel away from said body at a predetermined low vehicle speed.

4. An automotive vehicle of the type having a forwardly and rearwardly extending body and a forwardly and rearwardly extending imaginary plane passing through the center of gravity of the vehicle, said vehicle comprising: a pair of main ground engaging wheels consisting of a front wheel and a rear wheel mounted in said imaginary plane, the respective wheels being mounted forwardly and rearwardly of said center of gravity, first means biasing said rear wheel and body apart to yieldably support said body, a left auxiliary ground engaging balancing wheel and a right auxiliary ground engaging balancing wheel positioned on their respective sides of said imaginary plane, each of said auxiliary wheels being connected to and being extensible from said body from retracted positions, and means for automatically dropping said auxiliary wheels from said retracted positions into ground engagement and simultaneously restraining movement of said rear wheel away from said body during a skid of said rear wheel.

5. In an automotive vehicle of the type having a forwardly and rearwardly extending body and a forwardly and rearwardly extending imaginary plane passing through the center of gravity of the vehicle: a pair of main ground engaging wheels consisting of a front wheel and a rear wheel mounted in said imaginary plane, the respective wheels being mounted forwardly and rearwardly of said center of gravity, first means biasing said rear wheel and body apart to yieldably support said body, a left auxiliary ground engaging balancing wheel and a right auxiliary ground engaging balancing wheel positioned on their respective sides of said imaginary plane, each of said auxiliary wheels being connected to said body by extensible structure adapted to move said wheels from ground engagement to retracted positions, a wheel support platform for each auxliary wheel hinged to said body adjacent a respective auxiliary wheel, said platforms being movable from a generally horizontal position beneath an auxiliary wheel when in its retracted position to a generally vertical position clear of the auxiliary wheel, said auxiliary wheels normally resting on said platforms when in said retracted positions and being biased for movement to ground engagement against said platforms when in said retracted positions, said platforms having second means positioned adjacent said extensible structures for moving said platforms from said generally vertical to said generally horizontal positions, third means carried by said extensible structures for engaging said second means carried by said platforms to actuate said platforms when said auxiliary wheels are moved to said retracted positions, a manually actuated pedal for each auxiliary wheel, said pedals having normal positions with a predetermined limit of travel from said normal positions, fourth means which when actuated cause said platforms to move to said generally vertical positions to allow said auxiliary wheels to move into ground engagement, fifth means for interconnecting each auxiliary wheel to a respective pedal after said initial movement of said auxiliary wheels in a manner permitting movement of said pedals from said normal positions to thereafter produce a force moving said auxiliary wheels downwardly regardless of the amount of initial movement required for said auxiliary wheels to initially engage the ground, sixth means which when actuated restrains extension of said rear wheel from said body, and means for automatically actuating said fourth, fifth and sixth means when the r.p.m. of the rear wheel falls below a predetermined speed.

6. In an automotive vehicle of the type having a forwardly and rearwardly extending body and a forwardly and rearwardly extending imaginary plane passing through the center of gravity of the vehicle: a pair of main ground engaging wheels consisting of a front wheel and a rear wheel mounted in said imaginary plane, the respective wheels being mounted forwardly and rearwardly of said center of gravity, a left auxiliary ground engaging balancing wheel and a right auxiliary ground engaging balancing wheel positioned on their respective sides of said imaginary plane, each of said auxiliary wheels being connected to said body by extensible structure adapted to retract said wheels to a retracted position, means for individually extending said auxiliary wheels to apply pressure onto the ground to balance said vehicle on said main wheels, a wheel support platform for each auxiliary wheel hinged to said body adjacent a respective auxiliary wheel, said platforms being movable from a generally horizontal position beneath an auxiliary wheel when in its retracted position to a generally vertical position clear of the auxiliary wheel, said auxiliary wheels normally resting on said platforms when in their retracted positions and being biased for movement to ground engagement against said platforms when in said retracted positions, and means for locking said auxiliary wheels against retraction upon ground engagement.

7. In an automotive vehicle of the type having a forwardly and rearwardly extending body and a forwardly and rearwardly extending imaginary plane passing through the center of gravity of the vehicle: a pair of main ground engaging wheels consisting of a front wheel and a rear wheel mounted in said imaginary plane, the respective wheels being mounted forwardly and rearwardly of said center of gravity, a left auxiliary ground engaging balancing wheel and a right auxiliary ground engaging balancing wheel positioned on their respective sides of said imaginary plane, each of said auxiliary wheels being connected to said body by extensible structure adapted to retract said wheels, means for individually extending said auxiliary wheels to apply pressure onto the ground to balance said vehicle on said main wheels, a wheel support platform for each auxiliary wheel hinged to said body adjacent a respective auxiliary wheel, said platforms being movable from a generally horizontal position beneath an auxiliary wheel when in its retracted position to a generally vertical position clear of the auxiliary wheel, said auxiliary wheels normally resting on said platforms when in said retracted positions and being biased for movement to ground engagement against said platforms when in said retracted positions, said platforms having means positioned adjacent said extensible structures for moving said platforms from said generally vertical to said generally horizontal positions, and means carried by said extensible structures for engaging said means carried by said platforms to move said platforms to said generally horizontal positions beneath said auxiliary wheels when said auxiliary wheels are moved to said retracted positions.

8. In an automotive vehicle of the type having a forwardly and rearwardly extending body and a forwardly and rearwardly extending imaginary plane passing through the center of gravity of the vehicle: a pair of main ground engaging wheels consisting of a front wheel and a rear wheel mounted in said imaginary plane, the respective wheels being mounted forwardly and rearwardly of said center of gravity, said body being streamlined and having a smooth belly extending between said front and rear wheels, a left auxiliary ground engaging balancing wheel and a right auxiliary ground engaging balancing wheel positioned on their respective sides of said imaginary plane, each of said auxiliary wheels being connected to said body by extensible structure adapted to retract said wheels up into said body, means for individually extending said auxiliary wheels to apply pressure onto the ground to balance said vehicle on said main wheels, a wheel support platform for each auxiliary wheel hinged to said body adjacent a respective auxiliary wheel, said platforms being movable from a generally horizontal position beneath an auxiliary wheel when in its retracted position to a generally vertical position clear of the auxiliary wheel, said auxiliary wheels normally resting on said platforms when in said retracted positions and being biased for movement to ground engagement against said platforms when in said retracted positions, said platforms having means positioned adjacent said extensible structures for moving said platforms from said generally vertical to said generally horizontal positions, each wheel support platform having a toggle operatively connected between said body and said platform and arranged to be collapsed when said wheels are extended and to move to an extended position just short of an over-center position when said platform is moved to its generally horizontal position, and an electrical solenoid for each platform for holding the toggle in said extended position to hold its platform in said generally horizontal position and its wheel retracted.

9. An automotive vehicle of the type having a forwardly and rearwardly extending body and a forwardly and rearwardly extending imaginary plane passing through the center of gravity of the vehicle, said vehicle comprising: a pair of main ground engaging wheels consisting of a front wheel and a rear wheel mounted in said imaginary plane; the respective wheels being mounted forwardly and rearwardly of said center of gravity; a left auxiliary ground engaging balancing wheel and a right auxiliary ground engaging balancing wheel positioned on their respective sides of said imaginary plane, each of said auxiliary wheels being connected to and being extensible from said body from retracted positions; a manually actuated pedal for each auxiliary wheel, said pedals having normal positions with a predetermined limit of travel from said normal positions; first means for causing an initial movement of said auxiliary wheels from said retracted positions to ground engagement without moving said pedals out of their normal positions, and second means for interconnecting each auxiliary wheel to a respective pedal after said initial movement of said auxiliary wheels in a manner permitting movement of the pedal from said normal position to thereafter produce a force moving said auxiliary wheels downwardly regardless of the amount of initial movement required for said auxiliary wheels to initially engage the ground.

10. An automotive vehicle of the type having a forwardly and rearwardly extending body and a forwardly and rearwardly extending imaginary plane passing through the center of gravity of the vehicle, said vehicle comprising: a pair of main ground engaging wheels consisting of a front wheel and a rear wheel mounted in said imaginary plane; the respective wheels being mounted forwardly and rearwardly of said center of gravity; a left auxiliary ground engaging balancing wheel and a right auxiliary ground engaging balancing wheel positioned on their respective sides of said imaginary plane, each of said auxiliary wheels being connected to and being extensible from said body; an adjustable anchor for each auxiliary wheel; a manually actuated pedal for each auxiliary wheel, each pedal having a normal position from which it has limited travel; a cable for each auxiliary wheel operatively connected between the wheel, its anchor and pedal to extend the wheel, said anchors having a first position when said wheels are retracted and said anchors being biased toward second positions during which said cables are kept taut as said auxiliary wheels move downwardly into ground engagement; and means preventing movement of said anchors towards said first position after initial movement of said auxiliary wheels into ground engagement, whereby a full stroke of said pedal thereafter can be used to stabilize said vehicle.

11. An automotive vehicle of the type having a forwardly and rearwardly extending body and a forwardly and rearwardly extending imaginary plane passing through the center of gravity of the vehicle, said vehicle comprising: a pair of main ground engaging wheels consisting of a front wheel and a rear wheel mounted in said imaginary plane, the respective wheels being mounted forwardly and rearwardly of said center of gravity; a left auxiliary ground engaging balancing wheel and a right auxiliary ground engaging balancing wheel positioned on their respective sides of said imaginary plane, each of said auxiliary wheels being connected to and being extensible from said body; an adjustable anchor for each auxiliary wheel; a manually actuated pedal for each auxiliary wheel, each pedal having a normal position from which it has limited travel; a cable for each auxiliary wheel operatively connected between the wheel, its anchor and pedal to extend the wheel, said anchors having a first position when said auxiliary wheels are retracted and said anchors being biased toward second positions during which said cables are kept taut as said wheels move downwardly into ground engagement; stop means preventing movement of said anchors toward said first position after initial movement of said auxiliary wheels into ground engagement, solenoid means for releasing said stop means when said solenoid means is energized; and a governor for energizing said solenoid means when said vehicle is traveling above a predetermined speed.

12. An automotive vehicle of the type having a forwardly and rearwardly extending body and a forwardly and rearwardly extending imaginary plane passing through the center of gravity of the vehicle, said vehicle comprising: a pair of main ground engaging wheels consisting of a front wheel and a rear wheel mounted in said imaginary plane, the respective wheels being mounted forwardly and rearwardly of said center of gravity, a left auxiliary ground engaging balancing wheel and a right auxiliary ground engaging balancing wheel positioned on their respective sides of said imainary plane, each of said auxiliary wheels being connected to and being extensible from said body, means for individually extending said auxiliary wheels to balance said vehicle on said main wheels, means biasing said main wheels from said body, and clamping means for restraining extension of at least one of said main wheels from said body at predetermined times.

13. An automotive vehicle of the type having a forwardly and rearwardly extending body and a forwardly and rearwardly extending imaginary vertical plane passing through the vehicle's center of gravity, said vehicle comprising: a pair of main ground engaging wheels consisting of a front wheel and a rear wheel mounted in said imaginary plane, the respective wheels being mounted forwardly and rearwardly of said center of gravity, one of said wheels being steerable and the other of said wheels being nonsteerably supported relative to said body about a horizontal axis which remains normal to said plane; a left auxiliary ground engaging wheel and a right auxiliary ground engaging wheel positioned on their respective sides of said imaginary plane for ground engagement forwardly of said rear wheel, each of said auxiliary wheels being retractible out of ground engagement and being nonsteerably supported about axes generally parallel to said nonsteerable main wheel; automatic means for causing said auxiliary wheels to engage the ground when said rear main wheel skids; and means for controlling stability of the vehicle thereafter and including a first control element depressed by one foot of an operator for extending said left auxiliary wheel when in engagement with the ground; and a second control element depressed by the other foot of the operator for extending said right auxiliary wheel when in engagement with the ground.

14. An automotive vehicle of the type having a forwardly and rearwardly extending body and a forwardly and rearwardly extending imaginary vertical plane passing through the vehicle's center of gravity, said vehicle comprising: a pair of main ground engaging wheels consisting of a front wheel and a rear wheel mounted in said imaginary plane, the respective wheels being mounted forwardly and rearwardly of said center of gravity, one of said wheels being steerable and the other of said wheels being nonsteerably supported relative to said body about a horizontal axis which remains normal to said plane and said rear wheel and body being biased apart to resiliently support said body; a left auxiliary ground engaging wheel and a right auxiliary ground engaging wheel positioned on their respective sides of said imaginary plane, each of said auxiliary wheels being retractible out of ground engagement and being nonsteerably supported about axes generally parallel to said nonsteerable main wheel axis; said auxiliary wheels being positioned to the same side of said nonsteerable main wheel as said center of gravity; a pair of pedals individual ones of which operate individual ones of said auxiliary wheels, first means which when actuated causes an initial movement of said auxiliary wheels from said retracted positions to ground engagement without moving said pedals out of their normal positions, second means which when actuated interconnects each auxiliary wheel to a respective pedal after said initial movement of said auxiliary wheels in a manner permitting movement of said pedals from said normal positions to thereafter produce a force moving said auxiliary wheels downwardly regardless of the amount of initial movement required for said auxiliary wheels to initially engage the ground, third means which when actuated restrains extension of said rear wheel from said body, and means for automatically actuating said first, second and third means when said rear wheel skids.

15. An automotive vehicle of the type having a forwardly and rearwardly extending body and a forwardly and rearwardly extending imaginary vertical plane passing through the vehicle's center of gravity, said vehicle comprising: a pair of main ground engaging wheels consisting of a front wheel and a rear wheel mounted in said imaginary plane, the respective wheels being mounted forwardly and rearwardly of said center of gravity, one of said wheels being steerable and the other of said wheels being nonsteerably supported relative to said body about a horizontal axis which remains normal to said plane; a left auxiliary ground engaging wheel and a right auxiliary ground engaging wheel positioned on their respective sides of said imaginary plane, each of said auxiliary wheels being retractible out of ground engagement and being nonsteerably supported about axes generally parallel to said nonsteerable main wheel; automatic means for causing said auxiliary wheels to engage the ground when said nonsteerable main wheel skids; a pair of 18 pedals individual ones of which operated individual ones of said auxiliary wheels and whereby actuation of each pedal extends a respective auxiliary wheel to balance said vehicle, and means for automatically individually locking said pedals in actuated vehicle balancing positions.

16. An automotive vehicle of the type having a forwardly and rearwardly extending body and a forwardly and rearwardly extending imaginary vertical plane passing through the vehicle's center of gravity, said vehicle comprising: a pair of main ground engaging wheels consisting of a front wheel and a rear wheel mounted in said imaginary plane, the respective wheels being mounted forwardly and rearwardly of said center of gravity, one of said wheels being steerable and the other of said wheels being nonsteerably supported relative to said body about a horizontal axis which remains normal to said plane; a left auxiliary ground engaging wheel and a right auxiliary ground engaging wheel positioned on their respective sides of said imaginary plane, each of said auxiliary wheels being retractible out of ground engagement and being nonsteerably supported about axes generally parallel to said nonsteerable main wheel; automatic means for causing said auxiliary wheels to engage the ground when said rear wheel skids; a pair of pedals, means operatively connecting individual ones of said pedals to individual ones of said auxiliary wheels and including springs to resiliently bias respective auxiliary wheels into ground engagement, and means for automatically individually locking said pedals in actuated vehicle balancing positions.

References Cited by the Examiner

UNITED STATES PATENTS

| | | | |
|---|---|---|---|
| 1,117,476 | 11/1914 | Blondin | 280—303 |
| 1,152,821 | 9/1915 | Kurtz | 180—30 |
| 1,186,695 | 6/1916 | Slocomb. | |
| 1,235,747 | 8/1917 | Whitehall | 180—30 |
| 1,300,772 | 4/1919 | Purdy | 280—293 |
| 2,129,824 | 9/1938 | Seversky | 244—102 |
| 2,222,975 | 11/1940 | Brown | 244—102 |
| 2,398,541 | 4/1946 | Leach | 180—30 X |
| 2,577,246 | 12/1951 | Hill | 280—43.19 X |
| 2,589,023 | 3/1952 | Pattner | 180—30 |
| 3,024,860 | 3/1962 | Nicolai | 180—32 |

FOREIGN PATENTS

| | | |
|---|---|---|
| 156,487 | 2/1939 | Austria. |
| 354,053 | 6/1922 | Germany. |

BENJAMIN HERSH, *Primary Examiner.*

A. HARRY LEVY, KENNETH H. BETTS, MILTON BUCHLER, *Examiners.*